(12) United States Patent
Söllner

(10) Patent No.: US 10,625,950 B2
(45) Date of Patent: Apr. 21, 2020

(54) CONVEYING APPARATUS HAVING A SERRATED IMPACT BAR

(71) Applicant: STF MASCHINEN- & ANLAGENBAU GMBH, Aicha vorm Wald (DE)

(72) Inventor: Josef Söllner, Aicha vorm Wald (DE)

( * ) Notice: Subject to any disclaimer, the term of this patent is extended or adjusted under 35 U.S.C. 154(b) by 0 days.

(21) Appl. No.: 16/318,238

(22) PCT Filed: Jul. 19, 2017

(86) PCT No.: PCT/DE2017/100599
§ 371 (c)(1),
(2) Date: Jan. 16, 2019

(87) PCT Pub. No.: WO2018/014913
PCT Pub. Date: Jan. 25, 2018

(65) Prior Publication Data
US 2019/0152712 A1    May 23, 2019

(30) Foreign Application Priority Data
Jul. 20, 2016    (DE) .................... 20 2016 103 944 U

(51) Int. Cl.
*B65G 33/26*    (2006.01)
*B65G 33/18*    (2006.01)
*B65G 33/16*    (2006.01)
*B65G 33/02*    (2006.01)
*B65G 33/24*    (2006.01)
*B02C 18/22*    (2006.01)

(52) U.S. Cl.
CPC ........... *B65G 33/265* (2013.01); *B65G 33/02* (2013.01); *B65G 33/24* (2013.01); *B02C 18/2258* (2013.01)

(58) Field of Classification Search
None
See application file for complete search history.

(56) References Cited

U.S. PATENT DOCUMENTS 1,867,245 A  *  7/1932  Bailey ................. B65G 33/265
                                                    198/608
2,656,122 A     10/1953  Borner
(Continued)

FOREIGN PATENT DOCUMENTS

DE    102010036761 A1    2/2012
DE    102014105889 A1   10/2014

*Primary Examiner* — Kavel Singh
(74) *Attorney, Agent, or Firm* — Themis Law

(57) ABSTRACT

A conveying apparatus suitable for sturdy articles, in particular flattened plastic bottles or the like, in a recycling plant, has an upwardly moving continuous conveyor that includes a horizontal conveyor and a vertical conveyor connected to the horizontal conveyor, both conveyors having a tubular housing in which a respective conveying screw is rotatably mounted. The inner wall of the tubular housing of the vertical conveyor and the associated conveying screw have a vertical driver bar disposed therebetween, projecting radially inward from the tubular housing and spaced from the conveying screw by a distance (a). The driver bar has cutting teeth on its longitudinal edge located at least facing the conveying screw. Preferably, the driver bar is fastened in an interchangeable manner on the vertical tubular housing and has cutting teeth on both longitudinal edges.

7 Claims, 3 Drawing Sheets

(56) References Cited

U.S. PATENT DOCUMENTS

Figure 1:
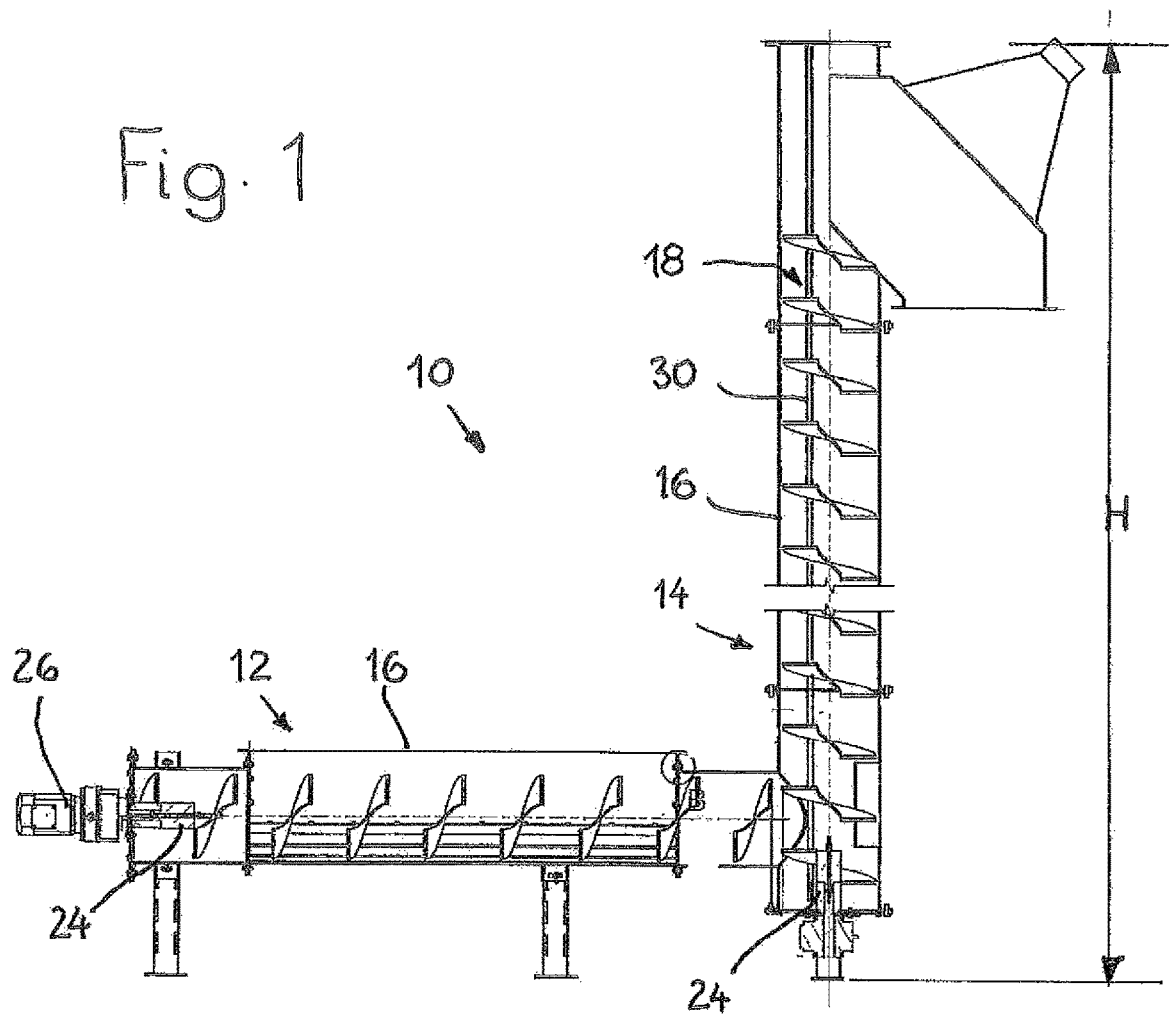

| | | |
|---|---|---|
| 2,844,332 A | 7/1958 | Girbow |
| 5,368,153 A | 11/1994 | Bruke |
| 6,543,606 B2 * | 4/2003 | Lindenblatt ............ B65G 33/02 198/443 |
| 9,650,598 B2 * | 5/2017 | Vogelsang ............. B65G 45/22 |

* cited by examiner

CONVEYING APPARATUS HAVING A SERRATED IMPACT BAR

The invention relates to a conveying apparatus suitable for sturdy articles, in particular flattened plastic bottles as well as cups, dishes or the like, in a recycling plant, comprising an upwardly moving continuous conveyor.

In recycling plants for the preparation and reuse of recyclable materials, these pass through several stations, which are interconnected via continuous conveyors. The continuous conveyors in this case consist of horizontally or obliquely aligned belt conveyors, which interconnect individual stations for sorting, for example, according to colours, washing, cleaning and drying. At the end of this processing chain the recyclable materials processed in the described manner are fed to a mill, the filling hopper of which should be loaded to a predetermined height.

For the processing of so-called PET bottles of polyethylene terephthalate, the last conveyor strand also consists of obliquely upwardly guiding belt conveyors, by means of which the bottles, after cleaning, colour sorting, removal of labels and pressing into a flat shape, must be transported to a height of about 10 m where, before loading the filling hopper into the mill, a horizontal section to be operated manually for separating rejects, for example, items not intended for the mill, is provided. Since the angle of ascent of this oblique conveyance must not exceed approximately 30° to avoid the bottles rolling back, the required length of the oblique conveyor measured in the plane is over 10 m in order to achieve a height of 8 m. This has the disadvantage that a very large amount of space is required in the recycling plant for this last conveyor section, which space is lost for other devices and must be taken into account when planning the fabrication operation.

Previous attempts to significantly reduce this last conveyor section by using screw conveyors have however yielded the result that particularly flattened plastic bottles or similar articles of sturdy material primarily clog the vertical conveyor since it cannot be prevented that the flattened articles jam between the inner wall of the screw housing and the conveyor screw. This has the result that the plant must frequently be switched off to laboriously remove the jammed items, which is frequently only possible with major expenditure of time and work.

It is fundamentally known from DE 38 177 A to attach stop rails in the cylindrical tubular housing of a vertical conveyor, which is intended to hinder co-rotation of the material to be raised, e.g. brown coal. A similar apparatus is known from JP 2004-075 369 A. However, both systems relate to the conveyance of solids in which there is no risk of any jamming of sturdy articles.

A conveying apparatus for sturdy articles, in particular flattened plastic bottles according to the preamble of claim 1 is the subject matter of DE 10 2014 105 889 A1. This takes up considerably less space in the plane compared with an oblique conveyor without there being any risk of operating disturbances as a result of jammed articles. As a result of the narrowing in the tubular housing of the vertical conveyor, flattened items of sturdy material can also no longer jam between the conveyor screw and the tubular housing since the items are deflected vertically upward at the vertical driver bars during rotation of the conveyor screw without entering into the gap between the conveyor screw and the inner wall of the tubular housing.

It is the object of the invention to configure the vertical conveyor so that during the upward conveyance a comminution of the article already takes place during the conveyance.

In order to solve this object, the at least one driver bar has cutting teeth on its longitudinal edge located opposite the conveying screw, which tear the material, predominantly flattened plastic bottles in the narrowing with the result that the conveying and comminuting process is optimized. In addition, the teeth of the driver bars have the effect that already during the conveyance of the material, labels and adhering dirt are released.

Here it is advantageous if the interchangeable driver bars have cutting teeth on both longitudinal edges so that they can be rapidly tuned after wear and can thus be used multiple times.

Figure 2:
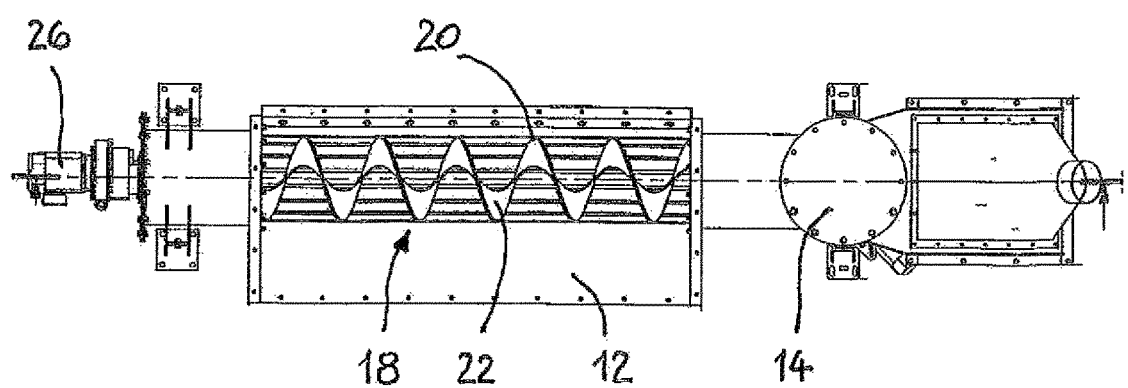
Figure 3:
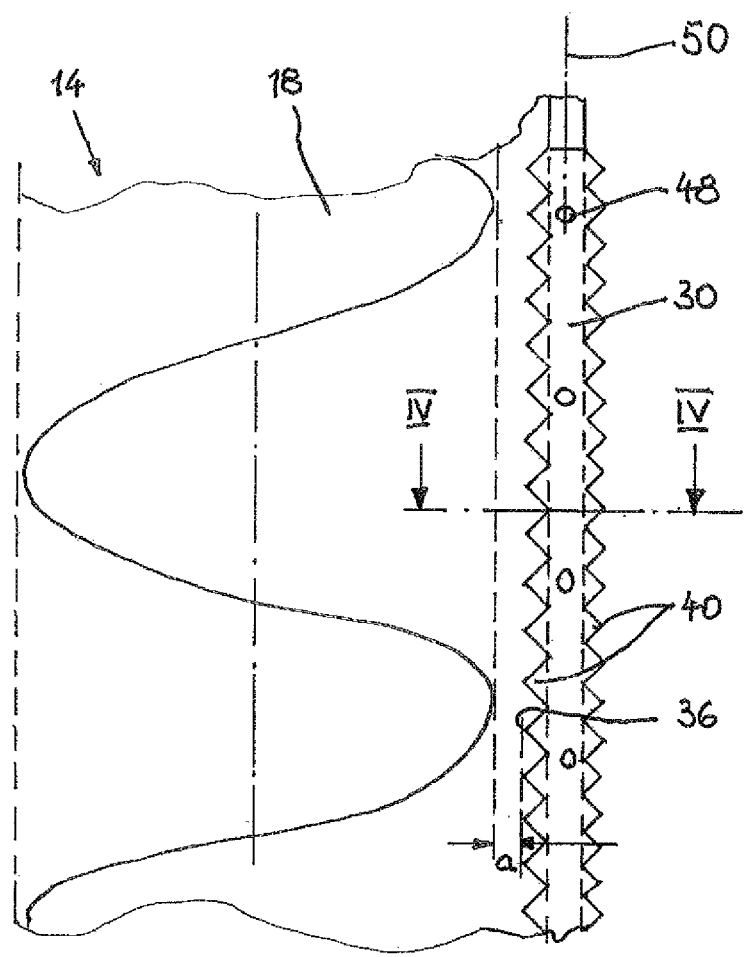
Figure 4:
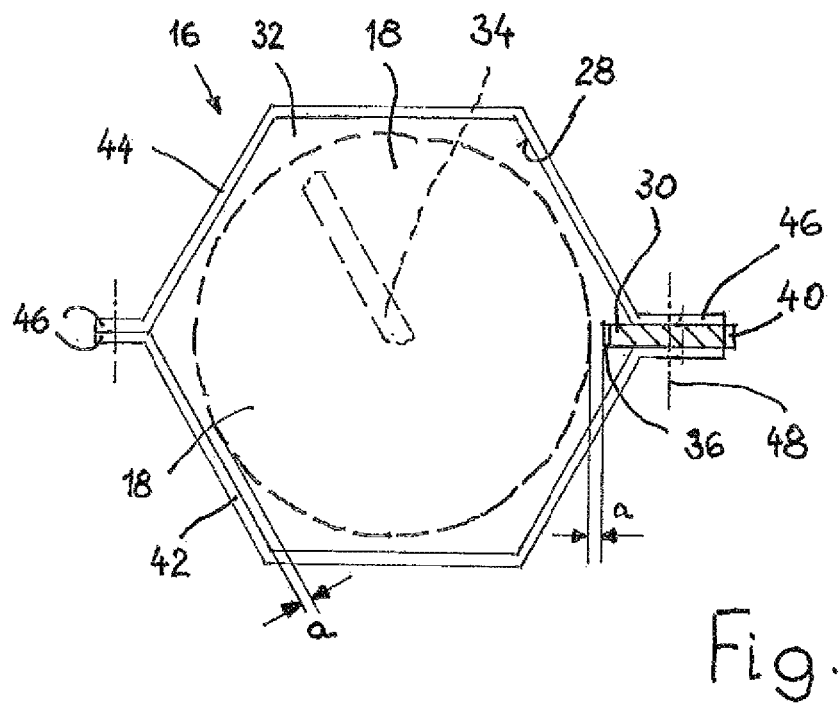
Figure 5:
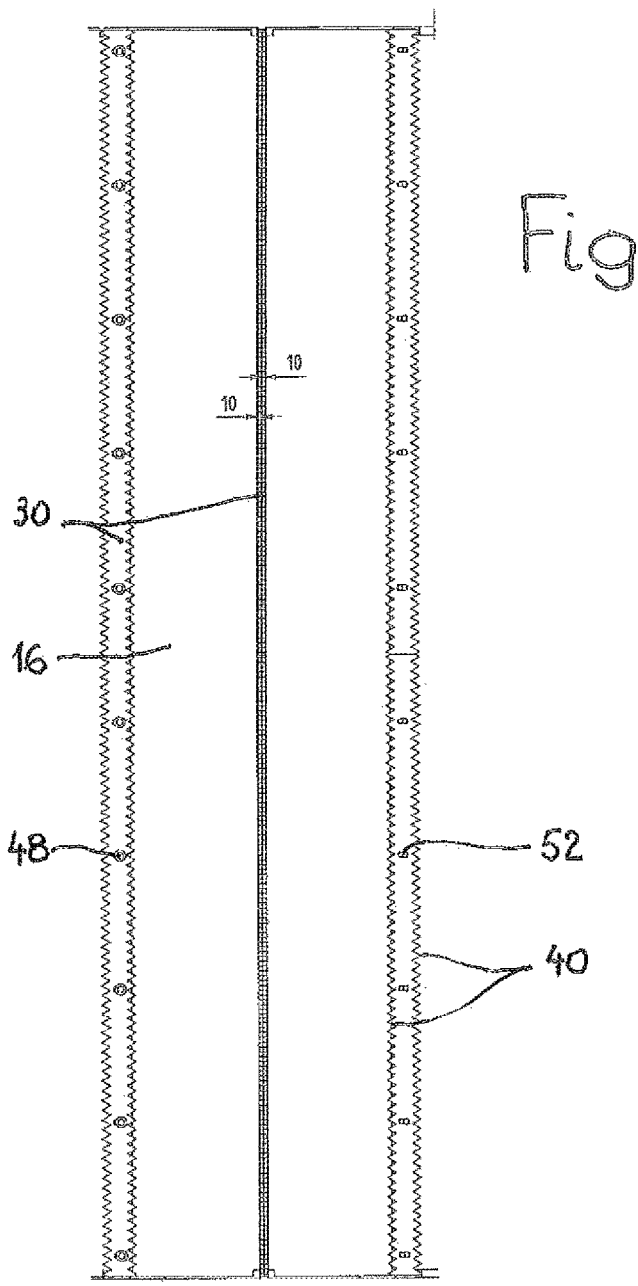
Figure 6:
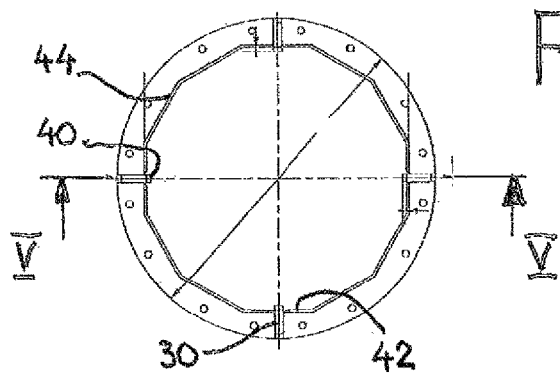
Figure 7:
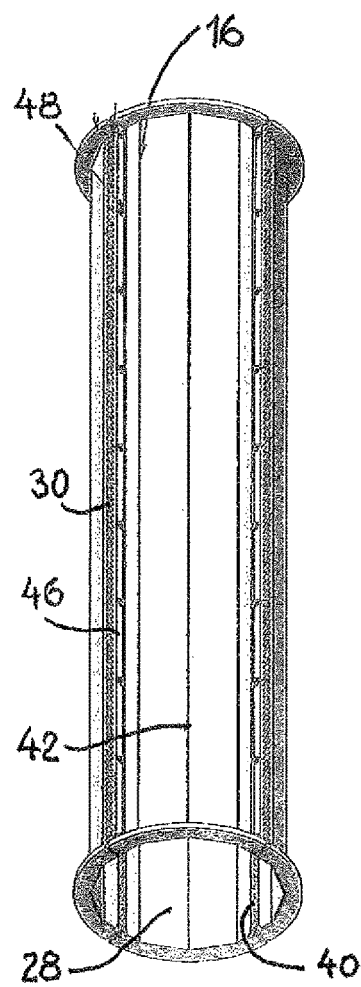

The invention is explained hereinafter with reference to exemplary embodiments, which are shown in the drawings. In the figures:

FIG. 1 shows a schematic vertical section through a conveying apparatus according to the invention, FIG. 2 shows a plan view of the conveying apparatus of FIG. 1, FIG. 3 shows a vertical section through the housing wall of the vertical conveyor, in which the narrowing is formed by a driver bar according to the invention, FIG. 4 shows a horizontal section through the vertical conveyor in the plane IV-IV of FIG. 3, FIG. 5 shows a longitudinal section through a housing according to a variant in the plane V-V of FIG. 6, FIG. 6 shows a cross-section through the housing of FIG. 5 and FIG. 7 shows a smaller view of the housing of FIGS. 5 and 6.

The conveying apparatus 10 according to the invention shown in FIGS. 1 and 2 is used for transporting sturdy articles, in particular flattened bottles, cups or dishes made of plastic in a recycling plant. This apparatus is configured as a continuous conveyor, which must overcome a certain height H (see FIG. 1) and which is composed of a horizontal conveyor 12 and a vertical conveyor 14. Both conveyors have a substantially cylindrical tubular housing 16. in which respectively one conveyor screw 18 is mounted, which can be configured according to FIG. 2 as a conveyor spiral 20 with a shaftless screw surface 22. In addition, it is also possible to provide a conveyor spiral 20 with an axial screw shaft, which is not shown.

As can be clearly seen in FIG. 1, both conveyor screws 18 are mounted rotatably at only one end 24 in a tubular housing 16, which is connected to the drive shaft of an electric motor 26. In the case of the vertical conveyor 14, as can be seen from FIG. 1, the lower end 24 of the conveyor screw 18 is mounted. The drive of the vertical conveyor 14 can alternatively also be provided at the upper end.

Two diametrically opposite driver bars 30 are attached to the inner wall 28 of the tubular housing 16 of the vertical conveyor 14, which, as shown in FIG. 1, extend vertically over the height H of the tubular housing 16. Between the driver bar 30 and the conveyor screw 18 there is left a clear distance a (FIGS. 3 and 4), which forms a narrowing to the flight circles of the conveyor screw 18 and also at the upper end of the vertical conveyor 14 prevents any contact between conveyor screw 18 and driver bar 30 and thus provides for optimal smooth running.

In the cross-section of FIG. 4 it is indicated that in the base 32 of the substantially cylindrical tubular housing 16 of the vertical conveyor 14, an opening 34 formed as a slot is incorporated, through which foreign bodies, for example, metal chippings, sand or other impurities can escape downwards.

As FIG. 4 further shows, the tubular housing 16 for the vertical conveyor 14 has a polygonal cross-section, for example, hexagonal or octagonal, with the result that the diameter and therefore the conveying capacity is increased. The polygonal housing 16 consists of flat wall segments 42, the distance of which at the narrowest point to the opposite flight circles of the conveyor screw 18 forms a narrowing having the dimension a.

It is further understood from FIG. 4 that the tubular housing 16 having a polygonal cross-section consists of two interconnected half shells 44, which are detachably interconnected via clamping flanges 46 and schematically indicated clamping screws 48. It is shown in the right-hand part of FIGS. 3 and 4 that a vertical driver bar 30 is enclosed between two screwed-together clamping flanges 46, the longitudinal edge 36 of which projecting into the housing 16 forms the desired narrowing to the conveyor screw 18. Preferably cutting teeth 40 are formed on both longitudinal edges 36 of the driver bar 30, the tips of which have a distance a to the flight circle of the conveyor screw 18. Since the driver bar 40 is fastened by means of the clamping screws 48 between the clamping flanges 46, it can easily be dismounted and re-inserted again after a rotation about the vertical axis 50 (FIG. 3) or about the transverse axis so that the previously unused and still-sharp teeth 40 are used.

The exemplary embodiment of FIGS. 5 to 7 shows a tubular housing 16, which here consists not of two half-shells but of four partial shells 44 which overall clamp together four drive bars 30. The clamping screws 48 required for this pass through radially aligned elongate holes 52 so that the driver bars 30 can be adjusted in the radial direction.

The partial shells 44, which each extend over a quadrant, are interconnected by their clamping flanges 46 so that the driver bars 30 thereby enclosed lie in the centre of a flat wall segment 42 and thus lie at the narrowest point between the inner wall 28 of the tubular housing 16 and the conveyor screw 18 not shown here.

The invention claimed is:

1. A conveying apparatus suitable for sturdy articles, in particular flattened plastic bottles or the like, processed in a recycling plant, comprising:
an continuous conveyor, which comprises a horizontal conveyor (12) and a vertical conveyor (14) connected to the horizontal conveyor, the horizontal and the vertical conveyors each having a tubular housing (16), in which a respective conveying screw (18) is mounted rotatably, the continuous conveyor being adapted to move the sturdy along the horizontal conveyor (12) and the vertical conveyor (14),
wherein, between an inner wall (28) of the tubular housing (16) of the vertical conveyor (14) and the associated conveying screw (18), at least one narrowing passage is formed, the narrowing passage being caused by a vertical driver bar (30), which projects radially inwards from an inner wall (28) of the tubular housing (16) and to define a spacing (a) from the conveying screw (18), and
wherein the driver bar (30) extends along an entire length of the conveying screw of the vertical conveyor (14) and has cutting teeth (40) along a longitudinal edge (36) facing the conveying screw (18).

2. The conveying apparatus according to claim 1, wherein the driver bar (30) is fastened in an interchangeable manner on the tubular housing (16) and has cutting teeth (40) on opposite longitudinal edges (36) of the driver bar (30).

3. The conveying apparatus according to claim 1, wherein the tubular housing (16) of the vertical conveyor has a polygonal cross-section with flat wall segments (42) and consists of interconnected partial shells (44), which are interconnected via clamping flanges (46), wherein the driver bar (30) is enclosed between two clamping flanges (46).

4. The conveying apparatus according to claim 3, wherein there is a plurality of driver bars (30) clamped at narrowest points between the inner wall (28) of the tubular housing (16) of the vertical conveyor and the conveying screw (18).

5. The conveying apparatus according to claim 3, wherein the partial shells (44) consist of half or quarter shells.

6. The conveying apparatus according to claim 3, wherein the driver bar (30) has longitudinally aligned elongate holes (52) for penetration of clamping screws (48) for fastening the driver bars (30) between the clamping flanges (46).

7. The conveying apparatus according to claim 1, wherein the driver bar (30) extends beyond an entire length of the conveying screw of the vertical conveyor (14).

* * * * *